Patented Dec. 2, 1924.

1,517,870

UNITED STATES PATENT OFFICE.

STEPHEN L. TINGLEY, OF NEW YORK, N. Y.

PRODUCTION OF SYNTHETIC AMMONIA.

No Drawing.   Application filed March 4, 1922.   Serial No. 541,223.

*To all whom it may concern:*

Be it known that I, STEPHEN L. TINGLEY, a citizen of the United States, residing in New York, in the county of New York and State of New York, have invented certain new and useful Improvements in the Production of Synthetic Ammonia, of which the following is a specification.

The invention relates to a method of decomposing steam in presence of nitrogen, and thereby forming ammonia simultaneously with the oxidation of a catalytic agent capable not only of assisting the reaction, but also of absorbing oxygen. The object of this invention is to dispense with a number of lengthy and expensive steps in the usual method of making ammonia from carbide through the instrumentality of cyanamide, and in addition to bring about almost instantaneous combination.

With these and other objects in view the invention consists in the novel steps and combination of steps constituting the process, all as will be more fully hereinafter disclosed and particularly pointed out in the claims.

As an illustration of this process I may take a highly heated gaseous mixture of steam and nitrogen present in such molecular proportions that ammonia shall be formed, and I bring finely powdered carbide into intimate contact with this gaseous mixture. As a result the steam is decomposed, the hydrogen uniting with the nitrogen, and the liberated oxygen forming a product with the carbide. This, being a solid, settles out and is easily removed from the ammonia gas, which may be recovered in any of the usual and well known methods, such as the absorption in water, acid, etc., by oxidation to a nitrate, or by liquefaction.

The reaction may take place at between 400 and 900 degrees centigrade, but I do not wish to be limited to this range. It is found that a very high temperature is preferable providing it does not reach the dissociation point of ammonia.

As is well known a very large amount of synthetic ammonia is converted into nitric acid and ammonium nitrate by means of oxidation in presence of a catalyst. Owing to impurities, especially sulphur, the gas-works ammonia is not suitable for this purpose, as the catalyst, which is almost invariably platinum gauze, is quickly poisoned.

My process lends itself very readily to this treatment, and it is possible to so arrange the apparatus that the steps may follow uninterruptedly.

It will be apparent at a glance that the method which I have evolved, is very much simpler and less costly than the old one at present in use. It is now customary to discharge melted carbide from the furnaces, and after cooling and grinding, to again heat to a high temperature before admitting the nitrogen to be absorbed. Considerable time is required to convert the mass into cyanamide, which usually carries about 20% combined nitrogen. The nitrogen content of the cyanamide is later converted into ammonia by digesting at high pressure in an autoclave. The latter is an expensive treatment, requiring not only costly apparatus but great skill in manipulation.

By the process which I have discovered and which is claimed in the present application, the reheating of the carbide and the troublesome autoclaving process is avoided. This is a most decided saving in both time, labor and tratment losses.

In the process claimed in the present application and above described, the carbide performs two functions, it acts first as a chemical agent and abstracts the oxygen from the superheated steam, and secondly as a catalytic agent and brings about the union of the nitrogen with the nascent hydrogen.

Various attempts have been made in the past to combine nitrogen and hydrogen at elevated temperatures but under normal pressures, but these have not proven successful as the combination only takes place at such high temperatures that the ammonia is dissociated almost as soon as it is formed. In the present invention this combination is brought about at a much lower temperature, and it is possible to substitute steam for hydrogen, which is a great saving. As carbide is a powerful reducing agent at the temperature of the reaction, the oxygen is easily broken off from the steam, and the carbide, functioning as a catalyst, brings about a combination of the nitrogen and hydrogen.

Although I have referred particularly to calcium carbide, I do not wish to be limited to this alone, as barium and like alkali-earth metal carbides may be substituted. I also do not wish to be limited to the employment of carbide alone as a catalyst, because the simultaneous presence of other catalysts is also frequently advantageous.

It is obvious that those skilled in the art may vary the details of the process without departing from the spirit of the invention, and therefore I do not wish to be limited to the above disclosures except as may be required by the claims.

I claim:—

1. A method of producing ammonia which comprises decomposing superheated steam mixed with nitrogen and in presence of carbide, and thereby oxidizing the carbide and bringing about a combination between the nitrogen and hydrogen; substantially as described.

2. A method of producing ammonia which comprises bringing into intimate contact a highly heated mixture of nitrogen and steam with finely divided calcium carbide and separating the resulting ammonia from the calcium carbonate produced during the reaction; substantially as described.

3. A method of producing ammonia which comprises highly heating an intimate mixture of nitrogen and steam and showering finely ground calcium carbide through the heated gaseous mixture, thereby producing ammonia and calcium carbonate; substantially as described.

4. A method of producing ammonia which comprises highly heating a mixture of nitrogen and steam, and showering finely divided calcium carbide through the heated gaseous mixture, and filtering off the resulting solid in the form of dust from the gaseous ammonia resulting from the reaction; substantially as described.

5. A method of producing ammonia which comprises bringing into intimate contact a highly heated mixture of nitrogen and steam with finely divided carbide, the temperature being maintained below the dissociation point of ammonia gas, and separating the solids from the ammonia formed; substantially as described.

6. A method of producing ammonia which comprises bringing into intimate contact a mixture of nitrogen and steam at a temperature of from 400 to 900 degrees centigrade with finely divided calcium carbide, and separating the resulting solid from the ammonia formed; substantially as described.

7. A method of producing ammonia which comprises heating a mixture of nitrogen and steam to a temperature of from 400 to 900 degrees centigrade, showering finely divided and heated carbide through this gaseous mixture, permitting the resulting oxidized powdered carbide to settle out from the gaseous ammonia formed during the reaction and absorbing the latter; substantially as described.

STEPHEN L. TINGLEY.